(12) United States Patent
Kantecki et al.

(10) Patent No.: US 10,884,970 B2
(45) Date of Patent: Jan. 5, 2021

(54) TECHNIQUES FOR COALESCING DOORBELLS IN A REQUEST MESSAGE

(71) Applicant: Intel Corporation, Santa Clara, CA (US)

(72) Inventors: Tomasz Kantecki, Ennis (IE);
Ben-Zion Friedman, Jerusalem (IL);
Niall D. McDonnell, Limerick (IE);
Bruce Richardson, Sixmilebridge (IE)

(73) Assignee: Intel Corporation, Santa Clara, CA (US)

( * ) Notice: Subject to any disclaimer, the term of this patent is extended or adjusted under 35 U.S.C. 154(b) by 858 days.

(21) Appl. No.: 15/392,181

(22) Filed: Dec. 28, 2016

(65) Prior Publication Data

US 2018/0181530 A1 Jun. 28, 2018

(51) Int. Cl.
*G06F 13/42* (2006.01)
*G06F 13/40* (2006.01)
*G06F 13/12* (2006.01)
*G06F 12/0875* (2016.01)

(52) U.S. Cl.
CPC ...... *G06F 13/4282* (2013.01); *G06F 12/0875* (2013.01); *G06F 13/126* (2013.01); *G06F 13/4022* (2013.01); *G06F 2212/452* (2013.01); *G06F 2213/0026* (2013.01)

(58) Field of Classification Search
None
See application file for complete search history.

(56) References Cited

U.S. PATENT DOCUMENTS

| 10,452,570 | B1 * | 10/2019 | Liguori | G06F 13/105 |
| 2002/0165899 | A1 | 11/2002 | Kagan et al. | |
| 2008/0209139 | A1 | 8/2008 | Wang et al. | |
| 2014/0181323 | A1 | 6/2014 | Manula et al. | |
| 2016/0224474 | A1 * | 8/2016 | Harriman | G06F 12/1036 |
| 2016/0275026 | A1 | 9/2016 | McDonnell et al. | |
| 2016/0306645 | A1 | 10/2016 | Serebrin | |
| 2019/0347125 | A1 * | 11/2019 | Sankaran | G06F 9/3863 |

OTHER PUBLICATIONS

International Search Report and Written Opinion for PCT Patent Application No. PCT/US2017/060432, dated Feb. 13, 2018, 9 pages.

* cited by examiner

*Primary Examiner* — Henry Tsai
*Assistant Examiner* — Christopher A Bartels
(74) *Attorney, Agent, or Firm* — Compass IP Law PC

(57) ABSTRACT

Examples include techniques for coalescing doorbells in a request message. Example techniques include gathering doorbells to access a device. The gathered are combined in a cache line structure and the cache line structure is written to a cache or buffer for a central processing unit in a single write operation.

22 Claims, 9 Drawing Sheets

*700*

GENERATE A PLURALITY OF DOORBELLS TARGETED TO A RESPECTIVE PLURALITY OF MEMORY RINGS OR QUEUES FOR A DEVICE ON A COMPUTING PLATFORM OPERATING ACCORDING TO A PCIe SPECIFICATION
702

COMBINE THE PLURALITY OF DOORBELLS IN A CACHE LINE STRUCTURE THAT INCLUDES SEPARATE INFORMATION FOR EACH DOORBELL
704

WRITE THE CACHE LINE STRUCTURE TO A CACHE OR BUFFER FOR A CPU OF THE COMPUTING PLATFORM IN A SINGLE WRITE OPERATION TO CAUSE THE PLURALITY OF DOORBELLS TO BE POSTED TO THE RESPECTIVE PLURALITY OF MEMORY RINGS OR QUEUES
706

FIG. 2

Code 400

```
For(#Queues) {
      For(#QueueDescriptors)
            4 x WB_MOVL      ; 16B descriptor in WC memory
}
Store_Fence
For(#Queues) {
      WC_MOVL       ; queue id
      WC_MOVL       ; update tail pointer
}
```

FIG. 4

Code 500

```
For(#Queues) {
     For(#QueueDescriptors)
          4 x WB_MOVL      ; 16B descriptor in WB memory
}
For(#Queues) {
     WB_MOVL     ; queue id
     WB_MOVL     ; update tail pointer
}
MOVDIR64B
```

GENERATE A PLURALITY OF DOORBELLS TARGETED TO A RESPECTIVE PLURALITY OF MEMORY RINGS OR QUEUES FOR A DEVICE ON A COMPUTING PLATFORM OPERATING ACCORDING TO A PCIe SPECIFICATION
702

COMBINE THE PLURALITY OF DOORBELLS IN A CACHE LINE STRUCTURE THAT INCLUDES SEPARATE INFORMATION FOR EACH DOORBELL
704

WRITE THE CACHE LINE STRUCTURE TO A CACHE OR BUFFER FOR A CPU OF THE COMPUTING PLATFORM IN A SINGLE WRITE OPERATION TO CAUSE THE PLURALITY OF DOORBELLS TO BE POSTED TO THE RESPECTIVE PLURALITY OF MEMORY RINGS OR QUEUES
706

FIG. 7

Storage Medium 800

*Computer Executable Instructions for 700*

TECHNIQUES FOR COALESCING DOORBELLS IN A REQUEST MESSAGE

TECHNICAL FIELD

Examples described herein are generally related to doorbells for a device having memory ring or queues.

BACKGROUND

Hardware devices included on or coupled with a computing platform may utilize communication protocols and interfaces, such as but not limited to, the Peripheral Component Interconnect (PCI) Express Base Specification, revision 3.1a, published in December 2015 ("PCI Express specification" or "PCIe specification"). Example hardware devices utilizing communication protocols and interfaces according to the PCIe specification may be referred to as PCIe devices. PCIe devices may have a doorbell-based host interface. The doorbell-based host interface may include a host (e.g., software device driver) putting descriptors on a memory ring for a given PCIe device and issuing a pointer update write to the PCIe device. The pointer update write is typically called a "doorbell".

BRIEF DESCRIPTION OF THE DRAWINGS

FIG. 2 illustrates example formats.
FIG. 4 illustrates an example first code.
FIG. 5 illustrates an example second code.
FIG. 7 illustrates an example of a logic flow.
FIG. 8 illustrates an example of a storage medium.

DETAILED DESCRIPTION

Modern PCIe devices in communication with device drivers at a host computing device such as, but not limited to, network interface cards (NICs) having switch capabilities or packet schedulers, cryptographic/compression accelerators (e.g., operated according to Intel® QuickAssist Technology (QAT)) or non-volatile memory controllers such as those operated according to an Non-Volatile Memory Express (NVMe) specification such as the NVMe specification, revision 1.2a, published in October 2015, may each support large numbers of memory ring/doorbell combinations. For these large numbers of memory ring/doorbell combinations, device drivers may write to a multitude of memory rings or queues for these types of PCIe devices. In some examples, when determining whether to issue doorbells at a low frequency or a high frequency a choice may need to be made between complexity/latency costs versus data bandwidth costs.

According to some examples, issuing doorbells at a high frequency may include issuing separate doorbells in separate request messages to targeted memory rings or queues for a PCIe device. Issuing doorbells at a relatively low frequency may include issuing a plurality of doorbells in batched or coalesced doorbells included in a single request message to targeted memory rings or queues for the PCIe device. For example, a NIC PCIe device having multiple transmit (Tx) descriptor rings for respective transmit queues may receive a request having coalesced doorbells that separately target individual Tx descriptor rings for the NIC PCIe device. Issuing separate doorbells at a high frequency in separate request messages to the NIC PCIe device may have less complexity and latency compared to issuing coalesced doorbells at a low frequency in a single request message. However, request message overhead for separate request messages may consume more data bandwidth compared to coalesced doorbells. It is with respect to these challenges of balancing complexity/latency with consumed data bandwidth that the examples described herein are needed.

Figure 1:
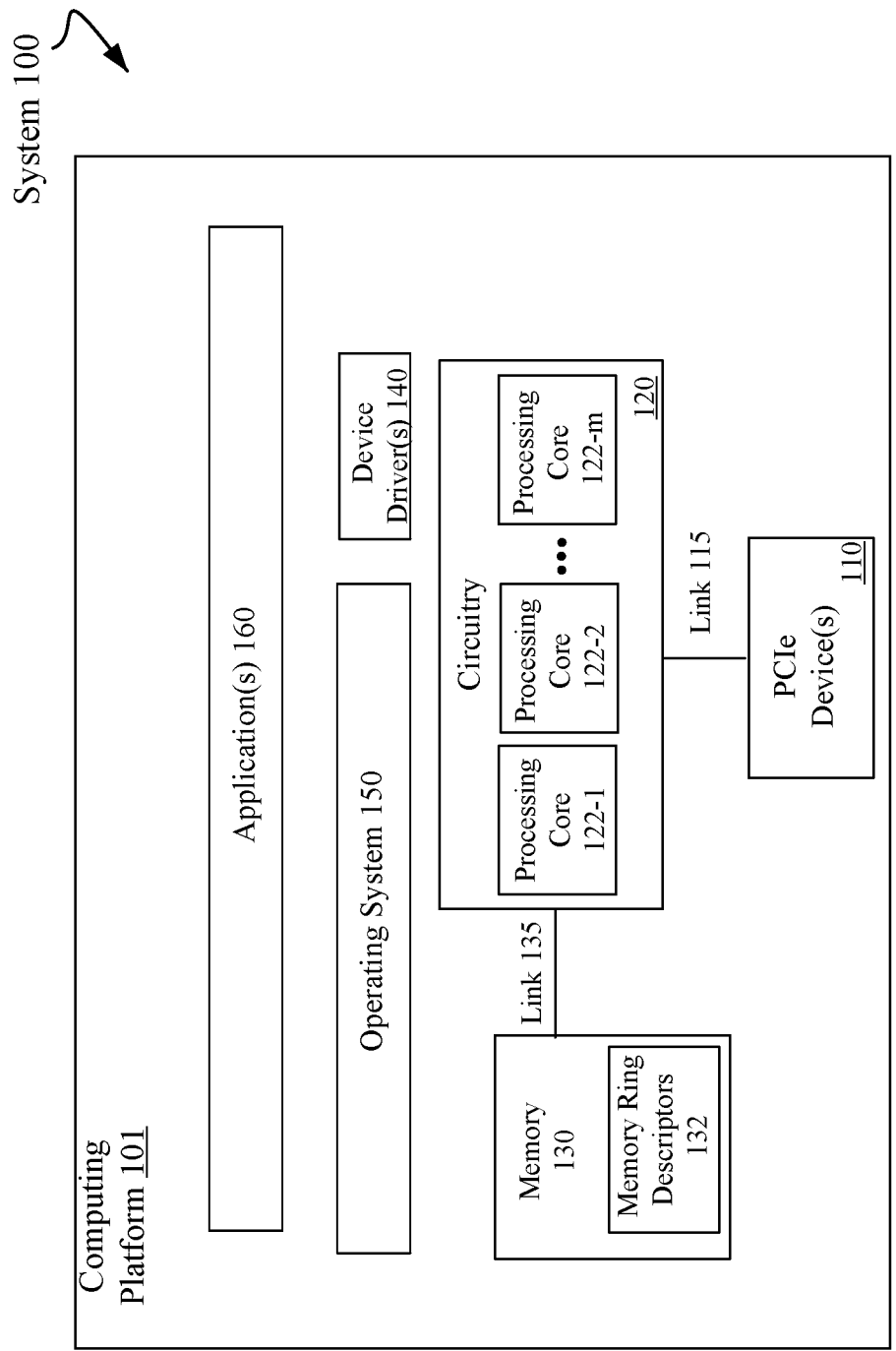
FIG. 1 illustrates an example system.

FIG. 1 illustrates an example system 100. In some examples, as shown in FIG. 1, system 100 includes a computing platform 101. For these examples, computing platform 101 may include one or more PCIe device(s) 110, circuitry 120, memory 130, one or more device driver(s) 140, an operating system 150 or one or more application(s) 160. In some examples, as shown in FIG. 1, circuitry 120 may communicatively couple to PCIe device(s) via link 115 and may also communicatively couple with memory 130 via link 135. In some examples, operating system 150, device driver(s) 140 or application(s) 160 may be implemented at least in part via cooperation between one or more memory devices included in memory 130 (e.g., volatile memory devices) and elements of circuitry 120 such as processing cores 122-1 to 122-$m$, where "m" is any positive whole integer greater than 2.

According to some examples, technologies including, but not limited to, technologies for an input/output memory management unit (IOMMU) and/or a PCIe root complex, both not shown, may be utilized by hardware elements of computing platform 101 (e.g., circuitry 120) to support communication between one or more host device drivers such as device driver(s) 140 and one or more PCIe devices such as PCIe device(s) 110. As described more below, communications may include use of a request message in the format of a write PCIe transaction layer packet (TLP) having a number of coalesced doorbells, whereby a device driver from among device driver(s) 140 may include logic and/or features to cause the posting of descriptors and data pointers for a plurality of memory rings or device queues via a single write operation to a structure that may be sized to match a given cache line structure (e.g., 64 bytes). The descriptors and data pointers for the plurality of memory rings or device queues, for example may be included in an allocated portion of memory 130 such as memory ring descriptors 132 shown in FIG. 1.

In some examples, a single write PCIe TLP request message sent to a PCIe device from among PCIe device(s) 110 via link 115 may use communication protocols according to the PCIe specification. The single write PCIe TLP request message may indicate to the PCIe device where the coalesced doorbells have been posted to memory 130. Also as described more below, a cache line structure (e.g. a central processing unit (CPU) cache line structure) may be utilized to facilitate posting or storing of the coalesced doorbells to respective memory rings or device queues via the single write operation.

In some examples, computing platform 101, may include, but is not limited to, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Also, circuitry 120 having processing cores 122-1 to 122-$m$ may include various commercially available processors, including without limitation an AMD® Athlon®, Duron® and Opteron® processors; ARM® application processor embedded and secure processors; IBM® and Motorola® DragonBall® and PowerPC® processors; IBM and Sony® Cell processors; Qualcomm® Snapdragon® processors; Intel® Atom®, Celeron®, Core (2) Duo®, Core i3, Core i5, Core i7, Itanium®, Pentium®, Xeon® or Xeon Phi® processors; and similar processors.

According to some examples, memory 130 may be composed of one or more memory devices or dies which may include various types of volatile and/or non-volatile memory. The one or more memory devises or dies may include various types of volatile and/or non-volatile memory. Volatile memory may include, but is not limited to, random-access memory (RAM), Dynamic RAM (D-RAM), double data rate synchronous dynamic RAM (DDR SDRAM), static random-access memory (SRAM), thyristor RAM (T-RAM) or zero-capacitor RAM (Z-RAM). Non-volatile memory may include, but is not limited to, non-volatile types of memory such as 3-D cross-point memory that may be byte or block addressable. These byte or block addressable non-volatile types of memory may include, but are not limited to, memory that uses chalcogenide phase change material (e.g., chalcogenide glass), multi-threshold level NAND flash memory, NOR flash memory, single or multi-level phase change memory (PCM), resistive memory, nanowire memory, ferroelectric transistor random access memory (FeTRAM), magnetoresistive random access memory (MRAM) that incorporates memristor technology, spin transfer torque MRAM (STT-MRAM), or a combination of any of the above, or other non-volatile memory types.

Figure 2:
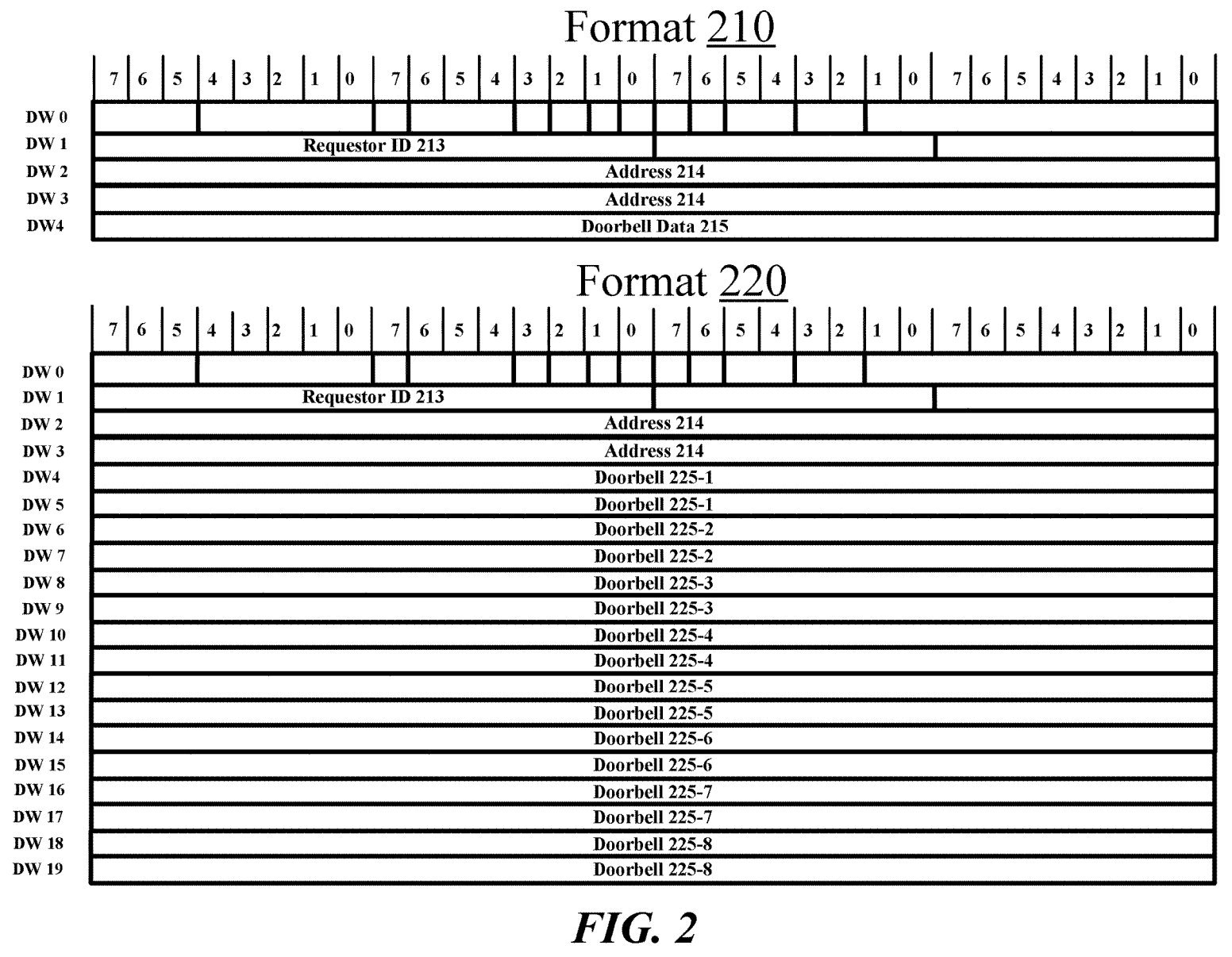

FIG. 2 illustrates example formats 210 and 220. In some examples, format 210 as shown in FIG. 2 may represent at least some fields of a write PCIe TLP request message sent to a PCIe device that includes a single doorbell and format 220 may represent at least some fields of a write PCIe TLP request message sent to a PCIe that includes multiple, coalesced doorbells. For these examples, both format 210 and format 220 include the same fields in double words (DWs) 0 to 3. For example, requestor identifier (ID) 213 and address 214. These same fields in format 210 and format 220 may represent transaction layer overhead for a write PCIe TLP request message. Requester ID 213 may indicate a requestor that has placed a write request associated with a doorbell (e.g., for format 210) or for a plurality of doorbells (e.g., format 220). Address 214 may indicate a 64-bit (64 b) address in a memory (e.g., memory 130) where the doorbell or doorbells have been posted to the memory.

According to some examples, when a single doorbell is sent to a PCIe device using format 210, address field 214 may be for a ring address register for memory rings of the PCIe device. Also, doorbell data 215 may identify number of available job descriptors on a ring structure for the PCIe device (e.g., maintained in memory 130) that may include a range of one or more valid requests submitted to the PCIe device via the memory rings. For example, if the PCIe device is an NVMe controller, doorbell data may include a tail/header pointer for an address range of one or more write requests to be placed in a submission queue for the NVMe controller. If the PCIe device is a NIC, doorbell data may include a tail/pointer for a range of one or more packet transmit requests to a targeted Tx descriptor ring. Thus, when using example format 210, PCIe specific overhead for a single doorbell may utilize 5 DWs or 20 bytes (B) of data bandwidth for a write PCIe TLP plus an additional 8 B for PCIe link layer overhead (not shown) for a total of 28 B per doorbell.

In some example, when batching or coalescing up to 8 doorbells to be sent to a PCIe device using format 220, address field 214 may include a 64 b address in a memory of a host computing platform where doorbell information for the 8 doorbells has been posted by the requestor identified in requester ID 213 (e.g., a device driver). In some examples, a requestor identified in requestor ID 213 (e.g., a device driver) may have utilized a structure (described more below) to post the 8 doorbells to the memory. DW 4 to DW 19 including doorbells 225-1 to 225-8 may include information for the PCIe device to identify respective memory rings or queues associated with each doorbell and also respective tail/header pointers to identify respective ranges of valid requests submitted to these memory rings or queues.

According to some examples, when using example format 220, PCIe specific overhead for 8 doorbells may utilize 20 DWs or 80 B of data bandwidth for a write PCIe TLP plus an additional 8 B for PCIe link layer overhead (not shown) for a total of 88 B. In comparison, if 8 doorbells were separately sent to a PCIe device in 8 separate write PCIe TLP request messages using example format 210, a total of 8×28 B or 224 B of data bandwidth would be needed. As a result of batching or coalescing 8 doorbells in a single write PCIe TLP in the format of example format 220, data bandwidth to provide these doorbells to a PCIe device is 224 B–88 B=136 B less compared to sending 8 separate doorbells using example format 210. That equates to an approximately 60% reduction in data bandwidth over a communication link coupled with the PCIe device.

Examples are not limited to a write PCIe TLP request message that includes 8 coalesced doorbells. More or less than 8 doorbells may be included in a write PCIe TLP request message.

Figure 3:
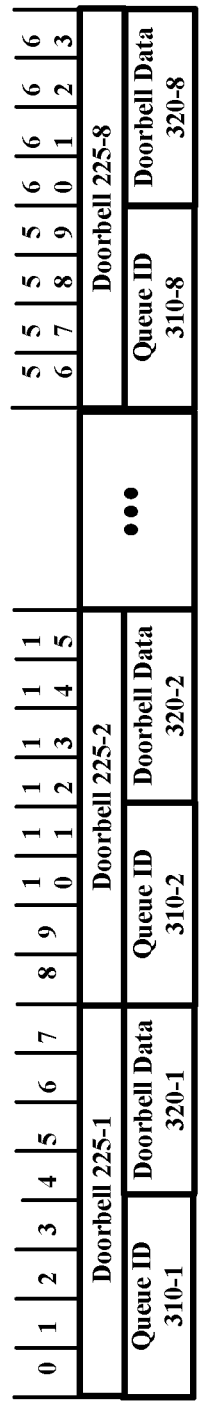
FIG. 3 illustrates an example structure.

FIG. 3 illustrates an example structure 300. In some examples, structure 300 may represent an example of a cache line structure used by a device driver to cause doorbells 225-1 to 225-8 to be posted or written to a PCIe device. For these examples, each doorbell included in structure 300 may hold 8 bytes of doorbell information. For example, doorbell 225-1 is shown in FIG. 3 as having a queue ID 310-1 field and a doorbell data 320-1 field. Each of these fields may include 4-byte fields. Although examples are not limited to fields of 4 bytes or to 2 fields for each doorbell.

According to some examples, queue ID 310 fields for doorbells 225-1 to 225-8 may identify memory rings for requests to a PCIe device. For these examples, both the device driver and the PCIe device needs to understand or know what the queue IDs are. For example, if the PCIe device is an NVMe controller, then a device driver for the NVMe controller may need a method to identify each submission queue for which a given doorbell may be associated. Identification may be included in capability register information provided to the device driver at time of startup or initiation of the NVMe controller.

In some examples, doorbell data 320 fields for doorbells 225-1 to 225-8 may include tail/head pointers that identify respective address ranges of valid requests for the PCIe device submitted to a PCIe device's memory ring.

According to some examples, a device driver may not have all 8 doorbells ready for submission. For these examples, a predefined value may be set for a queue ID 310 and a doorbell data 320 for any incomplete, empty or invalid doorbells. For example, a value of 0xffffffff may indicate incomplete, empty or invalid doorbells.

Examples are not limited to 64 B cache line structures. Cache line structures that may coalesce more or less doorbells than 8 are contemplated.

FIG. 4 illustrates an example code 400. In some examples, code 400 may represent a pseudocode for a device driver to write to a cache line structure that may be in a format of example structure 300. For these examples, a device driver implementing code 400 may use write back (WB) memory for creating descriptors on a device ring structure and write combine (WC) memory (e.g., a WC buffer or cache) to cause a posting of multiple doorbells to the PCIe device in a single PCIe TLP write operation.

According to some examples, "#Queues" may indicate a number of memory rings or request queues for a PCIe device for which the device driver is to post doorbells. "#Queues-Descriptors" may be a job description for a write combine operation "4×WB_MOVL" that adds 16 B of descriptor information to a CPU cache or memory buffer. "Store_Fence" may make sure that created descriptors become visible to PCIe devices and CPU cores before WB doorbells are sent to a PCIe device.

In some examples, an instruction of "Store_Fence" may not be needed at the end of code 400 on the basis that a write combine memory will self evict once 64 B is reached for the 8 doorbells. However, if unacceptably high latency results from this type of self eviction, a second "Store_Fence" may be needed. Also, since each doorbell is 8 B in size, a MOVDIRI instruction (not shown) may be used for the $8^{th}$ and last doorbell to force immediate eviction. Otherwise, some CPU cache line architectures that use write combine memory may not guarantee an immediate eviction after the $8^{th}$ doorbell.

According to some examples, device drivers may need to map a doorbell register range as WC. Also, automatic eviction from a CPU cache using WC memory may happen with at least some CPU architectures when causing a write operation of all 64 B. Also, a WC memory type may require a special register layout on a hardware side of a host computing platform to allow for speculative reads. Also, computing platform memory to receive the posted doorbells may need to be able to accept n*8 B writes (where "n" is any positive, whole integer), since a WC memory may flush at any time.

FIG. 5 illustrates an example code 500. In some examples, code 500 may represent a pseudo code for a device driver to write to a cache line structure that may be in a format of example structure 300. For these examples, a device driver implementing code 500 may use write back (WB) memory (e.g., a write back buffer or cache).

According to some examples, "#Queues" may indicate a number of memory rings or request queues for a PCIe device for which the device driver is to post doorbells. "#Queue-Descriptors" may be a job description for a write back operation "4×WB_MOVL" that adds 16 B of descriptor information to a CPU cache or memory buffer.

In some examples, in contrast to code 400, the instruction "Store_Fence" is not required for code 500 due to the use of the "MOVDIR64 B" instruction. Also, WB memory may be used to store a coalesced doorbell structure and the "MOVDIR64 B" instruction may be used to post or copy the doorbells to a PCIe device's memory rings or queues in a CPU cycle efficient way (e.g., weakly ordered). Also, no special register layout may be needed on a hardware side of a host computing platform to avoid speculative reads. Also, computing platform memory to receive posted doorbells may only need to accept 64 B writes when a device driver uses or implements code 500.

Figure 6:
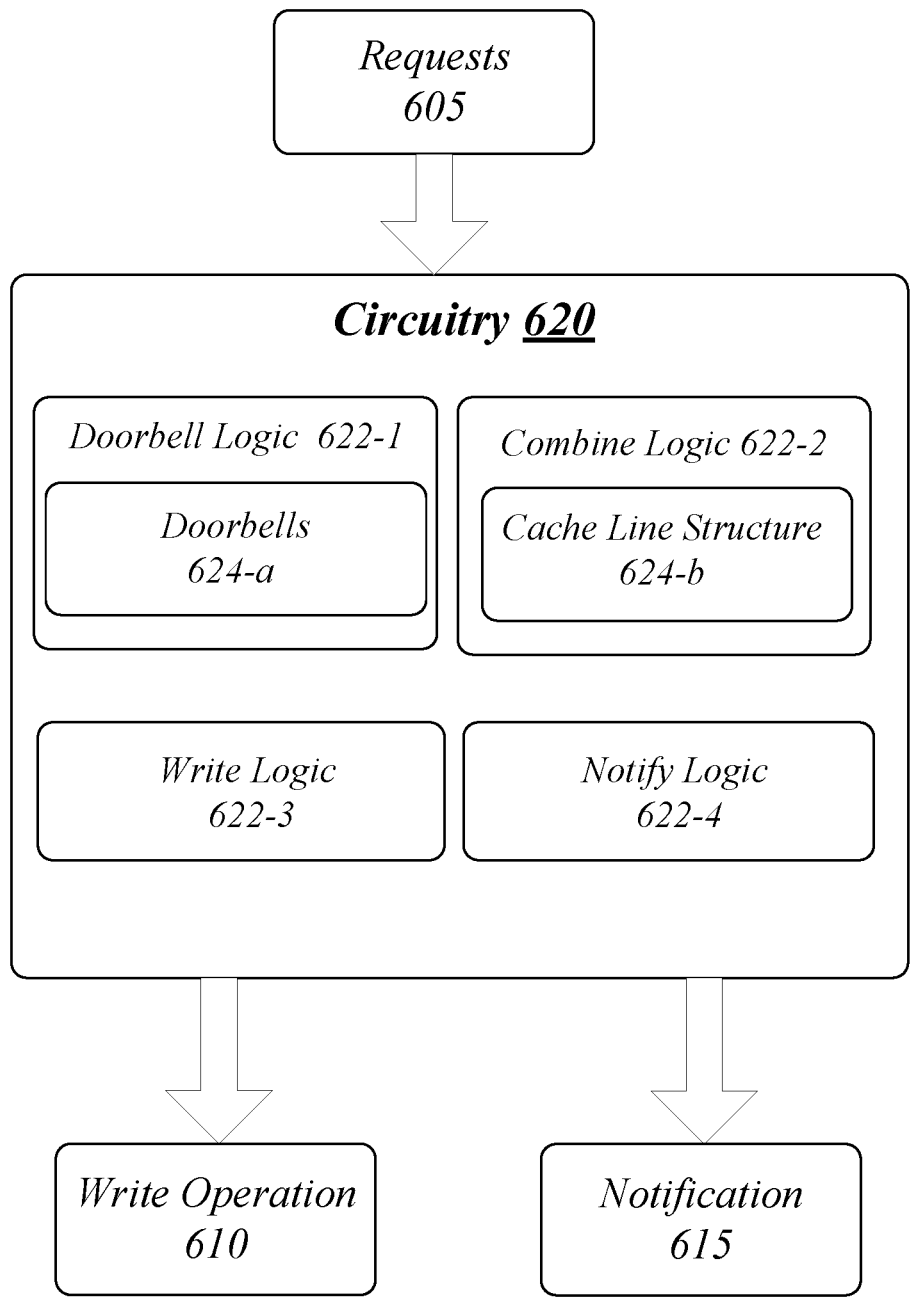
FIG. 6 illustrates an example block diagram for an apparatus.

FIG. 6 illustrates an example block diagram for apparatus 600. Although apparatus 600 shown in FIG. 6 has a limited number of elements in a certain topology, it may be appreciated that the apparatus 600 may include more or less elements in alternate topologies as desired for a given implementation.

According to some examples, apparatus 600 may be supported by circuitry 620. For these examples, circuitry 620 may be a processor or circuitry for a computing system, e.g., circuitry 120 as shown in FIG. 1. Circuitry 620, in some examples, may include a CPU cache, registers or buffers. Circuitry 620 may be arranged to execute one or more software or firmware implemented modules, components or logic 622-a (module, component or logic may be used interchangeably in this context). It is worthy to note that "a" and "b" and "c" and similar designators as used herein are intended to be variables representing any positive integer. Thus, for example, if an implementation sets a value for a=4, then a complete set of software or firmware for modules, components or logic 622-a may include logic 622-1, 622-2, 622-3 or 622-4. The examples presented are not limited in this context and the different variables used throughout may represent the same or different integer values. Also, "logic", "module" or "component" may also include software/firmware stored in computer-readable media, and although types of logic are shown in FIG. 6 as discrete boxes, this does not limit these types of logic to storage in distinct computer-readable media components (e.g., a separate memory, etc.).

According to some examples, circuitry 620 may include circuitry, a processor, processor circuit or processor circuitry. Circuitry 620 may be generally arranged to execute one or more software components 622-a. Circuitry 620 may be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 620 may also include an application specific integrated circuit (ASIC) and at least some logic 622-a may be implemented as hardware elements of the ASIC. According to some examples, circuitry 620 may also include a field programmable gate array (FPGA) and at least some logic 622-a may be implemented as hardware elements of the FPGA.

According to some examples, apparatus 600 may include doorbell logic 622-1. Doorbell logic 622-1 may be executed by circuitry 620 to generate a plurality of doorbells targeted to a respective plurality of memory rings or queues for a device on a computing platform having apparatus 600. The device may be communicatively coupled with circuitry 620 via a link arranged to operate according to a PCIe specification (e.g., PCIe Base Specification, revision 3.1a). For these examples, doorbells 624-a may, at least temporarily, include the plurality of doorbells. Doorbells 624-a may be maintained by doorbell logic 622-1 in a data structure (e.g., a lookup table). The doorbells may be generated responsive to requests 605. Requests 605 may include requests to access or use the device (e.g., placed by applications hosted by the computing platform including apparatus 600).

In some examples, apparatus 600 may include a combine logic 622-2. Combine logic 622-2 may be executed by circuitry 620 to combine the plurality of doorbells in a cache line structure that includes separate information for each doorbell. For these examples, the cache line structure may be in the example format of structure 300 shown in FIG. 3 and may be maintained in cache line structure 624-b.

According to some examples, apparatus 600 may also include a write logic 622-3. Write logic 622-3 may be executed by circuitry 620 to write the cache line structure to a CPU cache. The CPU cache may be included in circuitry 620 and the cache line structure may be written in a single write operation to cause the plurality of doorbells to be posted to the respective plurality of memory rings or queues. For these examples, write operation 610 may include an operation to write the cache line structure to the CPU cache.

In some examples, apparatus 600 may also include a notify logic 622-4. Notify logic 622-4 may be executed by circuitry 620 to cause a write PCIe TLP request message to be generated and sent to the device, the write PCIe TLP request message to include the separate information for each doorbell. For these examples, notification 615 may include a notification that causes elements of circuitry 620 (e.g., a PCIe root complex) to generate the write PCIe TLP request message and send it to the device.

Various components of apparatus 600 and a device or node implementing apparatus 600 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 7 illustrates an example logic flow 700. Logic flow 700 may be representative of some or all of the operations executed by one or more logic, features, or devices described herein, such as apparatus 600. More particularly, logic flow 700 may be implemented by at least doorbell logic 622-1, combine logic 622-2, write logic 622-3 or notify logic 622-4.

According to some examples, logic flow 700 at block 702 may generate a plurality of doorbells targeted to a respective plurality of memory rings or queues for a device on a computing platform operating according to a PCIe specification. For these examples, doorbell logic 622-1 may generate the plurality of doorbells.

In some examples, logic flow 700 at block 704 may combine the plurality of doorbells in a cache line structure that includes separate information for each doorbell. For these examples, combine logic 622-2 may combine the plurality of doorbells in the cache structure.

According to some examples, logic flow 700 at block 706 may write the cache line structure to a cache or buffer for a CPU of the computing platform in a single write operation to cause the plurality of doorbells to be posted to the respective plurality of memory rings or queues. For these examples, write logic 622-3 may write the cache line structure to the cache or buffer for the CPU.

FIG. 8 illustrates an example storage medium 800. As shown in FIG. 8, the first storage medium includes a storage medium 800. The storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions to implement logic flow 700. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
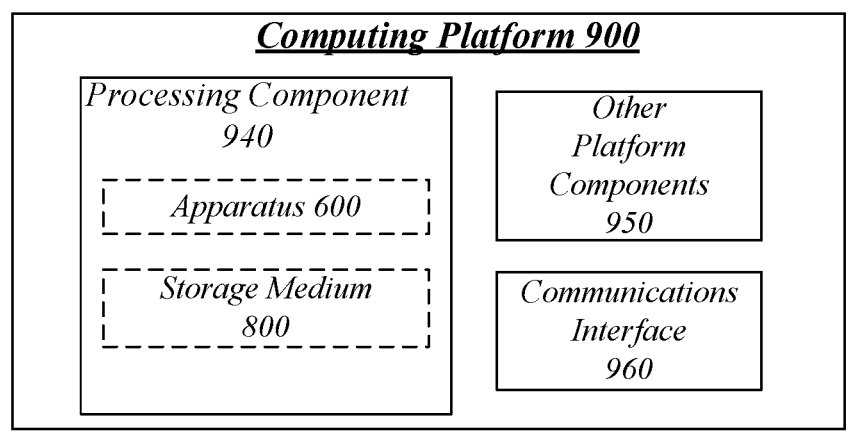
FIG. 9 illustrates an example computing platform.

FIG. 9 illustrates an example computing platform 900. In some examples, as shown in FIG. 9, computing platform 900 may include a processing component 940, other platform components 950 or a communications interface 960.

According to some examples, processing component 940 may execute processing operations or logic for apparatus 600 and/or storage medium 800. Processing component 940 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, ASICs, programmable logic devices (PLDs), digital signal processors (DSPs), FPGAs, memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (APIs), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 950 may include common computing elements, memory units, chipsets, controllers, peripherals, interfaces, oscillators, timing devices, video cards, audio cards, multimedia input/output (I/O) components (e.g., digital displays), power supplies, and so forth. Examples of memory units or memory devices may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 960 may include logic and/or features to support a communication interface. For these examples, communications interface 960 may include one or more communication interfaces that operate according to various communication protocols or standards to communicate over direct or network communication links. Direct communications may occur via use of communication protocols or standards described in one or more industry standards (including progenies and variants) such as those associated with the PCIe specification. Network communications may occur via use of communication protocols or standards such those described in one or more Ethernet standards promulgated by the Institute of Electrical and Electronics Engineers (IEEE). For example, one such Ethernet standard promulgated by IEEE may include, but is not limited to, IEEE 802.3-2012, Carrier sense Multiple access with Collision Detection (CSMA/CD) Access Method and Physical Layer Specifications, Published in December 2012 (hereinafter "IEEE 802.3 specification"). Network communication may also occur according to one or more OpenFlow specifications such as the OpenFlow Hardware Abstraction API Specification. Network communications may also occur according to Infiniband Architecture specification.

Computing platform 900 may be implemented in a server or client computing device. Accordingly, functions and/or specific configurations of computing platform 900 described herein, may be included or omitted in various embodiments of computing platform 900, as suitably desired for a server or client computing device.

The components and features of computing platform 900 may be implemented using any combination of discrete circuitry, application specific integrated circuits (ASICs), logic gates and/or single chip architectures. Further, the features of computing platform 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function.

The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled" or "coupled with", however, may also mean that two or more elements are not in direct contact with each other, but yet still co-operate or interact with each other.

The follow examples pertain to additional examples of technologies disclosed herein.

Example 1

An example apparatus may include circuitry for a computing platform, the circuitry to include a CPU cache. The apparatus may also include doorbell logic for execution by the circuitry to generate a plurality of doorbells targeted to a respective plurality of memory rings or queues for a device on the computing platform communicatively coupled with the circuitry via a link arranged to operate according to a PCIe specification. The apparatus may also include combine logic for execution by the circuitry to combine the plurality of doorbells in a cache line structure that includes separate information for each doorbell. The apparatus may also include write logic for execution by the circuitry to write the cache line structure to the CPU cache in a single write operation to cause the plurality of doorbells to be posted to the respective plurality of memory rings or queues.

Example 2

The apparatus of example 1 may also include notify logic for execution by the circuitry to cause a write PCIe TLP request message to be generated and sent to the device. The write PCIe TLP request message may include the separate information for each doorbell.

Example 3

The apparatus of example 1, the separate information for each doorbell may include respective identifier information for each respective memory ring or queue to uniquely identify each respective memory ring and to include a tail pointer to indicate respective address ranges for each respective memory ring or queue having valid requests for the device.

Example 4

The apparatus of example 1 may also include the single write operation comprises the write logic to write the cache line structure to the CPU cache via use of write combine memory.

Example 5

The apparatus of example 1, the single write operation may include the write logic to write the cache line structure to the CPU cache via use of write back memory.

Example 6

The apparatus of example 1, the cache line structure may have a size of 64 bytes and the separate information for each doorbell has a size of 8 bytes.

Example 7

The apparatus of example 1, the device may be a NIC having switch capabilities, a cryptographic accelerator or a non-volatile memory controller.

Example 8

The apparatus of example 1 may also include a digital display coupled to the circuitry to present a user interface view.

Example 9

An example method may include generating a plurality of doorbells targeted to a respective plurality of memory rings or queues for a device on a computing platform operating according to a PCIe specification. The method may also include combining the plurality of doorbells in a cache line structure that includes separate information for each doorbell. The method may also include writing the cache line structure to a cache or buffer for a CPU of the computing platform in a single write operation to cause the plurality of doorbells to be posted to the respective plurality of memory rings or queues.

Example 10

The method of example 9 may also include causing a write PCIe TLP request message to be generated and sent to the device, the write PCIe TLP request message including the separate information for each doorbell.

Example 11

The method of example 9, the separate information for each doorbell may include respective identifier information for each respective memory ring or queue to uniquely identify each respective memory ring and may also include a tail pointer to indicate respective address ranges for each respective memory ring or queue having valid requests for the device.

Example 12

The method of example 9, the single write operation may include writing the cache line structure to the cache or buffer using write combine memory.

Example 13

The method of example 9, the single write operation may include writing the cache line structure to the cache or buffer using write back memory.

Example 14

The method of example 9, the cache line structure may have a size of 64 bytes and the separate information for each doorbell may have a size of 8 bytes.

Example 15

The method of example 9, the device may be a NIC having switch capabilities, a cryptographic accelerator or a non-volatile memory controller.

Example. 16

An example at least one machine readable medium may include a plurality of instructions that in response to being executed by a system may cause the system to carry out a method according to any one of examples 9 to 15.

Example 17

An example apparatus may include means for performing the methods of any one of examples 9 to 15.

Example 18

An example at least one machine readable medium may include a plurality of instructions that in response to being executed by a system at a computing platform may cause the system to generate a plurality of doorbells targeted to a respective plurality of memory rings or queues for a device on the computing platform, the device to operate according to a PCIe specification. The instructions may also cause the system to combine the plurality of doorbells in a cache line structure that includes separate information for each doorbell. The instructions may also cause the system to write the cache line structure to a cache or buffer for a CPU of the computing platform in a single write operation to cause the plurality of doorbells to be posted to the respective plurality of memory rings or queues.

Example 19

The at least one machine readable medium of example 18, the instructions may further cause the system to cause a write PCIe TLP request message to be generated and sent to the device. For these examples, the write PCIe TLP request message may include the separate information for each doorbell.

Example 20

The at least one machine readable medium of example 18, the separate information for each doorbell may include respective identifier information for each respective memory ring or queue to uniquely identify each respective memory ring and may also include a tail pointer to indicate respective address ranges for each respective memory ring or queue having valid requests for the device.

Example 21

The at least one machine readable medium of example 18, the single write operation may include the system to write the cache line structure to the cache or buffer via use of write combine memory.

Example 22

The at least one machine readable medium of example 18, the single write operation may include the system to write the cache line structure to the cache or buffer via use of write back memory.

Example 23

The at least one machine readable medium of example 18, the cache line structure may have a size of 64 bytes and the separate information for each doorbell may have a size of 8 bytes.

Example 24

The at least one machine readable medium of example 18, the device may be a NIC having switch capabilities, a cryptographic accelerator or a non-volatile memory controller.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. An apparatus comprising:
   circuitry for a computing platform, the circuitry to include a central processing unit (CPU) cache;
   doorbell logic for execution by the circuitry to generate a plurality of doorbells targeted to a respective plurality of memory rings or queues for a device on the computing platform communicatively coupled with the circuitry via a link arranged to operate according to a peripheral component interconnect express (PCIe) specification;
   combine logic for execution by the circuitry to combine the plurality of doorbells in a cache line structure that includes separate information for each doorbell, the cache line structure to have a size of 64 bytes; and
   write logic for execution by the circuitry to write the cache line structure to the CPU cache in a single write operation to cause the plurality of doorbells to be posted to the respective plurality of memory rings or queues.

2. The apparatus of claim 1, comprising:
notify logic for execution by the circuitry to cause a write PCIe transaction layer packet (TLP) request message to be generated and sent to the device, the write PCIe TLP request message to include the separate information for each doorbell.

3. The apparatus of claim 1, comprising the separate information for each doorbell to include respective identifier information for each respective memory ring or queue to uniquely identify each respective memory ring and to include a tail pointer to indicate respective address ranges for each respective memory ring or queue having valid requests for the device.

4. The apparatus of claim 1, the single write operation comprises the write logic to write the cache line structure to the CPU cache via use of write combine memory.

5. The apparatus of claim 1, the single write operation comprises the write logic to write the cache line structure to the CPU cache via use of write back memory.

6. The apparatus of claim 1, comprising the separate information for each doorbell has a size of 8 bytes.

7. The apparatus of claim 1, the device comprises a network interface card (NIC) having switch capabilities, a cryptographic accelerator or a non-volatile memory controller.

8. The apparatus of claim 1, comprising a digital display coupled to the circuitry to present a user interface view.

9. A method comprising:
generating a plurality of doorbells targeted to a respective plurality of memory rings or queues for a device on a computing platform operating according to a peripheral component interconnect express (PCIe) specification;
combining the plurality of doorbells in a cache line structure that includes separate information for each doorbell, the cache line structure having a size of 64 bytes; and
writing the cache line structure to a cache or buffer for a central processing unit (CPU) of the computing platform in a single write operation to cause the plurality of doorbells to be posted to the respective plurality of memory rings or queues.

10. The method of claim 9, comprising:
causing a write PCIe transaction layer packet (TLP) request message to be generated and sent to the device, the write PCIe TLP request message including the separate information for each doorbell.

11. The method of claim 9, comprising the separate information for each doorbell including respective identifier information for each respective memory ring or queue to uniquely identify each respective memory ring and including a tail pointer to indicate respective address ranges for each respective memory ring or queue having valid requests for the device.

12. The method of claim 9, the single write operation comprises writing the cache line structure to the cache or buffer using write combine memory.

13. The method of claim 9, the single write operation comprises writing the cache line structure to the cache or buffer using write back memory.

14. The method of claim 9, comprising the separate information for each doorbell having a size of 8 bytes.

15. The method of claim 9, the device comprises a network interface card (NIC) having switch capabilities, a cryptographic accelerator or a non-volatile memory controller.

16. At least one machine readable medium comprising a plurality of instructions that in response to being executed by a system at a computing platform cause the system to:
generate a plurality of doorbells targeted to a respective plurality of memory rings or queues for a device on the computing platform, the device to operate according to a peripheral component interconnect express (PCIe) specification;
combine the plurality of doorbells in a cache line structure that includes separate information for each doorbell, the cache line structure to have a size of 64 bytes; and
write the cache line structure to a cache or buffer for a central processing unit (CPU) of the computing platform in a single write operation to cause the plurality of doorbells to be posted to the respective plurality of memory rings or queues.

17. The at least one machine readable medium of claim 16, comprising the instructions to further cause the system to:
cause a write PCIe transaction layer packet (TLP) request message to be generated and sent to the device, the write PCIe TLP request message to include the separate information for each doorbell.

18. The at least one machine readable medium of claim 16, comprising the separate information for each doorbell to include respective identifier information for each respective memory ring or queue to uniquely identify each respective memory ring and to include a tail pointer to indicate respective address ranges for each respective memory ring or queue having valid requests for the device.

19. The at least one machine readable medium of claim 16, the single write operation comprises the system to write the cache line structure to the cache or buffer via use of write combine memory.

20. The at least one machine readable medium of claim 16, the single write operation comprises the system to write the cache line structure to the cache or buffer via use of write back memory.

21. The at least one machine readable medium of claim 16, comprising the separate information for each doorbell has a size of 8 bytes.

22. The at least one machine readable medium of claim 16, the device comprises a network interface card (NIC) having switch capabilities, a cryptographic accelerator or a non-volatile memory controller.

* * * * *